(12) United States Patent
Zimmermann et al.

(10) Patent No.: US 8,682,256 B2
(45) Date of Patent: Mar. 25, 2014

(54) DYNAMIC ACTIVATION OF RECEIVE DIVERSITY

(75) Inventors: Manfred Zimmermann, Sauerlach (DE); Thorsten Kneip, Duisburg (DE); Michael Schneider, Munich (DE)

(73) Assignee: Intel Mobile Communications GmbH, Neubiberg (DE)

( * ) Notice: Subject to any disclaimer, the term of this patent is extended or adjusted under 35 U.S.C. 154(b) by 280 days.

(21) Appl. No.: 13/248,117

(22) Filed: Sep. 29, 2011

(65) Prior Publication Data

US 2013/0084808 A1    Apr. 4, 2013

(51) Int. Cl.
*H04B 17/00* (2006.01)

(52) U.S. Cl.
USPC ............... 455/67.11; 455/67.13; 455/63.1; 455/101; 455/562.1; 455/575.7; 455/67.16; 455/522; 343/700 MS; 343/890; 343/895; 343/702

(58) Field of Classification Search
USPC ........... 455/67.11, 101, 67.13, 562.1, 575.7, 455/450, 452.1, 522, 67.16, 506, 63.1; 343/700 MS, 890, 895, 766, 702
See application file for complete search history.

(56) References Cited

U.S. PATENT DOCUMENTS

| | | | | |
|---|---|---|---|---|
| 6,993,063 | B2 * | 1/2006 | Zeira et al. | 375/130 |
| 7,366,247 | B2 * | 4/2008 | Kim et al. | 375/267 |
| 7,801,496 | B2 * | 9/2010 | Kaikkonen et al. | 455/101 |
| 7,885,608 | B2 * | 2/2011 | Nilsson et al. | 455/69 |
| 8,380,133 | B2 * | 2/2013 | Lakshmanan et al. | 455/63.4 |
| 8,396,003 | B2 * | 3/2013 | Leinonen et al. | 370/252 |
| 8,441,913 | B2 * | 5/2013 | Li et al. | 370/208 |
| 8,442,538 | B2 * | 5/2013 | Segall et al. | 455/442 |
| 2004/0253955 | A1 | 12/2004 | Love et al. | |
| 2008/0187076 | A1 | 8/2008 | Wu et al. | |
| 2008/0188183 | A1 | 8/2008 | Dwyer et al. | |
| 2009/0042532 | A1 * | 2/2009 | Bienas et al. | 455/403 |
| 2011/0189984 | A1 * | 8/2011 | Xin et al. | 455/420 |

FOREIGN PATENT DOCUMENTS

| | | |
|---|---|---|
| GB | 2345416 A | 7/2000 |
| WO | 2005084379 A2 | 9/2005 |

* cited by examiner

*Primary Examiner* — Marceau Milord

(57) ABSTRACT

A method, system, and computer program product for managing a plurality of antennas on user equipment. A connection status module is configured to monitor the plurality of antennas for a data packet of a plurality of data. A control module is configured to power more than one of the plurality of antennas to measure signal quality in response to receiving the data packet. The signal quality comprises a power level of each of the plurality of antennas and a correlation of the plurality of antennas. An antenna quality module is configured to determine whether the correlation of the plurality of antennas is greater than a threshold in response to the connection status being active.

11 Claims, 6 Drawing Sheets

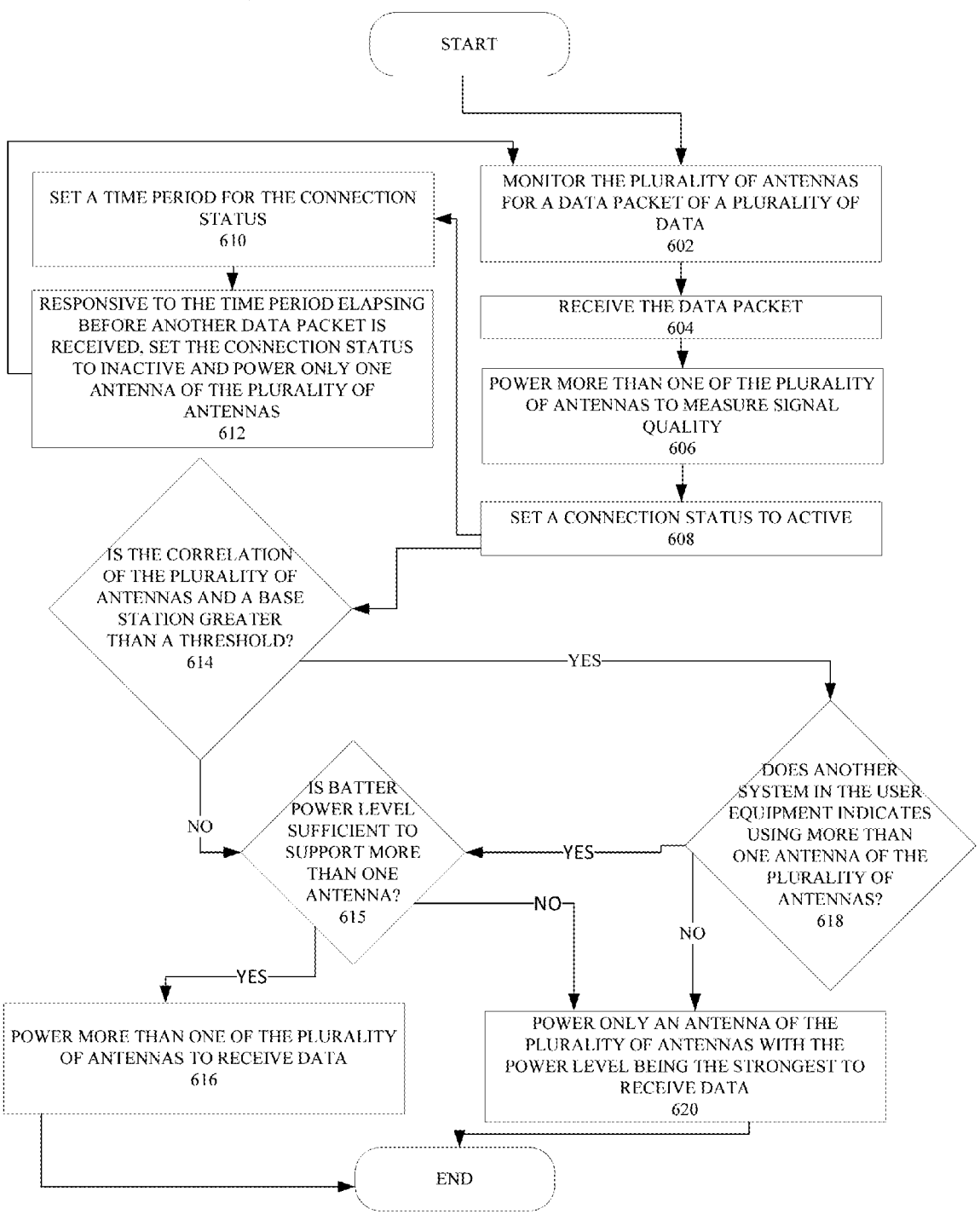

DYNAMIC ACTIVATION OF RECEIVE DIVERSITY

TECHNICAL FIELD

Various embodiments relate generally to energy conservation, such as in communication devices, for example. In particular, the various embodiments relate to dynamic activation of receive diversity in communication devices.

BACKGROUND

Wireless communication devices communicate with another device on a wireless link. Sometimes, in urban and indoor environments, there is no clear line-of-sight (LOS) between transmitter and receiver. Instead the signal is reflected along multiple paths before finally being received. Each of these bounces can introduce phase shifts, time delays, attenuations, and distortions that can destructively interfere with one another at the aperture of the receiving antenna.

Antenna diversity, also referred to as receive diversity, uses two or more antennas to improve the quality and reliability of a wireless link. Antenna diversity is especially effective at mitigating these multipath situations. This is because multiple antennas offer a receiver several observations of the same signal. Each antenna will experience a different interference environment. Thus, if one antenna is experiencing a deep fade, it is likely that another has a sufficient signal. Collectively such a system can provide a robust link.

Inherently an antenna diversity scheme requires additional hardware and integration versus a single antenna system but due to the commonality of the signal paths a fair amount of circuitry can be shared. Also with the multiple signals there is a greater processing demand placed on the receiver, which can lead to tighter design requirements. Typically, however, signal reliability is paramount and using multiple antennas is an effective way to decrease the number of drop-outs and lost connections.

Therefore, it would be advantageous to have a method, system, and computer program product that addresses one or more of the issues discussed above.

SUMMARY

A method, system, and computer program product for managing a plurality of antennas on user equipment. A connection status module is configured to monitor the plurality of antennas for a data packet of a plurality of data. A control module is configured to power more than one of the plurality of antennas to measure signal quality in response to receiving the data packet. The signal quality comprises a power level of each of the plurality of antennas and a correlation of the plurality of antennas. An antenna quality module is configured to determine whether the correlation of the plurality of antennas is greater than a threshold in response to the connection status being active.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 6 is a flowchart for managing a plurality of antennas on user equipment in accordance with an illustrative embodiment. Process 600 may be implemented in antenna management system 12 from FIG. 2.

DETAILED DESCRIPTION

The following detailed description refers to the accompanying drawings that show, by way of illustration, specific details and embodiments in which the invention may be practiced. The word "exemplary" is used herein to mean "serving as an example, instance, or illustration". Any embodiment or design described herein as "exemplary" is not necessarily to be construed as preferred or advantageous over other embodiments or designs.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "different embodiments", "alternative embodiment", and the like are intended to mean that any such features are included in one or more embodiments of the present disclosure, and may or may not necessarily be combined in the same embodiments.

The various embodiments take into account that in a wireless connection, throughput in fading conditions can be improved by 30-100% with receive diversity (two or more receive antennas & receiver branches) data, but at the expense of a higher power consumption, e.g. 30 mA.

The various embodiments take into account that current systems statically switch on or off receive diversity for a data connection. The user equipment can either benefit from potential data throughput gain or from lower power consumption. Decision has to be taken at link setup.

The foregoing has outlined rather broadly the features and technical advantages of the different illustrative embodiments in order that the detailed description of the invention that follows may be better understood. Additional features and advantages of the different illustrative embodiments will be described hereinafter. It should be appreciated by those skilled in the art that the conception and the specific embodiments disclosed may be readily utilized as a basis for modifying or redesigning other structures or processes for carrying out the same purposes of the different illustrative embodiments. It should also be realized by those skilled in the art that such equivalent constructions do not depart form the spirit and scope of the invention as set forth in the appended claims.

Figure 1:
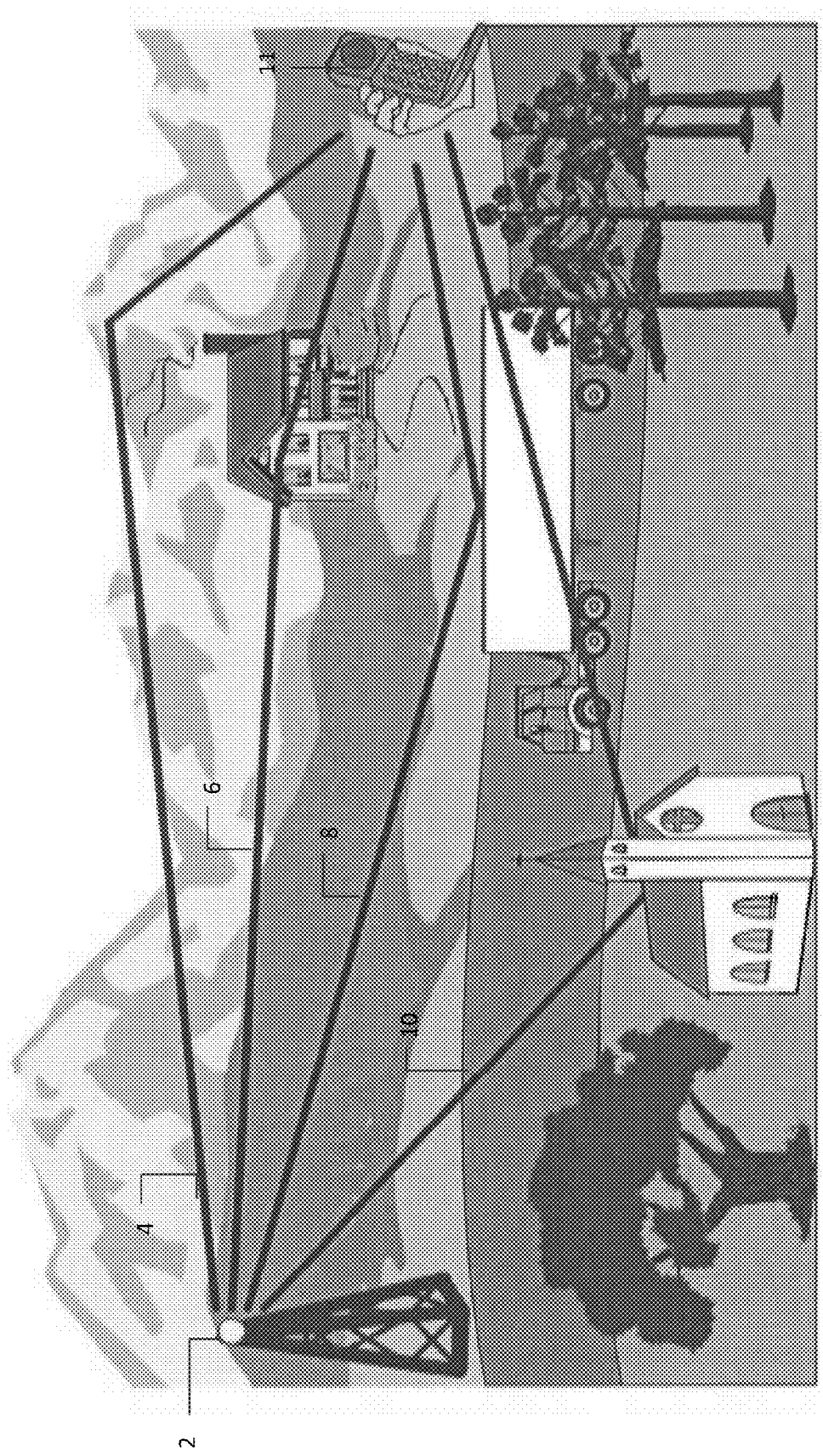
FIG. 1 is an illustration of multiple propagation paths of a signal in accordance with an illustrative embodiment.

FIG. 1 is an illustration of multiple propagation paths of a signal in accordance with an illustrative embodiment. Base station 2 transmits a signal to user equipment 11 which follows multiple propagation paths. Propagation paths 4, 6, 8, and 10 are some examples of the multiple propagation paths. A propagation path obstruction is a man-made or natural physical feature that lies near enough to a signal path to cause a measurable effect on path loss. An obstruction may lie to the side, above, or below the path, and for example may be ridges, bridges, cliffs, buildings, vehicles, and trees. The multiple propagation paths may be caused by reflection, diffraction, and scattering. The multiple propagation paths may be different with respect to length and therefore propagation time to the receiving device. Different propagation paths may add constructively or destructively to the signal strength depending on the relative phase shift of each path. Additionally, due to a changing environment and a mobile receiving device, also referred to as user equipment herein, the propagation paths may change over time.

User equipment 11 may receive the signal from propagation paths 4-10. User equipment 11 may comprise a plurality of antennas, for example, two antennas, an antenna quality module, a connection status module, a control module, other systems, a memory element, and a processing unit. In other embodiments, user equipment 11 may include other components and elements as well.

The antennas in user equipment 11 may be connected to a control module. The control module may be associated with the antenna quality module and the connection status module. The antenna quality module and the connection status module may be part of the processing unit or their own separate processing units. The antenna quality module and the connection status module may be configured to send recommendations to the control module to power one or both antennas in user equipment 11. The connection between the control module and the antennas may not be direct. For example, the control module may be connected to a unit which activates the antennas. More specifically, in some embodiments, the radio frequency unit of each antenna may be connected to an amplifier, filter, or device with a high power consumption.

User equipment 11 may include a packet oriented receiver unit, such as a high speed downlink packet access receiver unit. The control module may be connected to the high speed downlink packet access receiver unit. The control module may also be connected to other systems, such as a voice oriented receiver unit, or a receiver unit for another type of data packet transmission technique. The control module may take recommendations from the antenna quality module and the connection status module as well as the other systems.

The antenna quality module and the connection status module may have components linked to the antennas in user equipment 11 for measuring properties of the antennas. In different embodiments, the antenna quality module and the connection status module may be the same module, included with the control module, or included as part of the processing unit.

Figure 2:
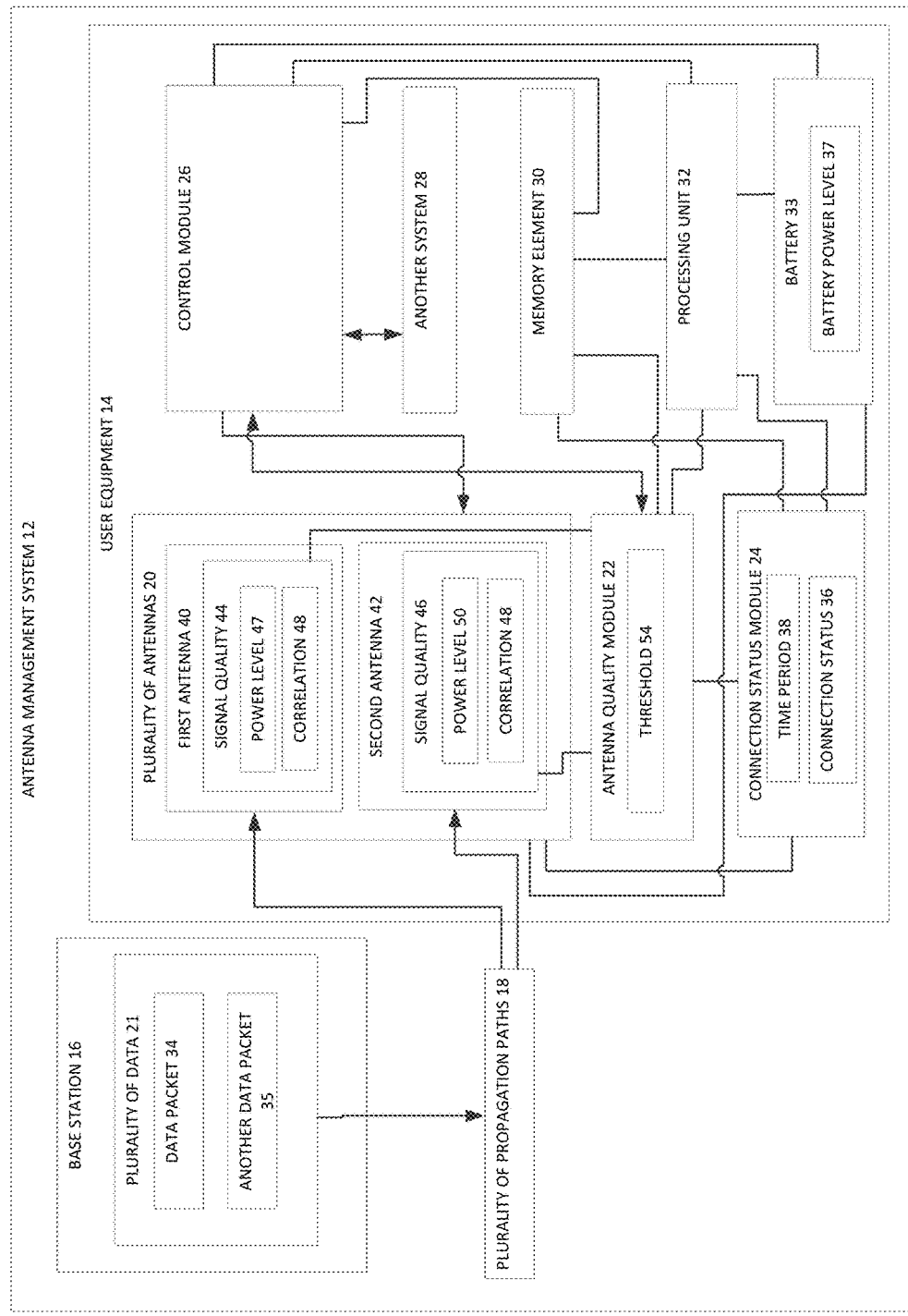
FIG. 2 is a block diagram of an antenna management system in accordance with an illustrative embodiment.

FIG. 2 is a block diagram of an antenna management system in accordance with an illustrative embodiment. Antenna management system 12 manages the operation of plurality of antennas 20, which may include first antenna 40 and second antenna 42, associated with user equipment 14. In different embodiments, it may be desirable to have different antennas or numbers of antennas powered "on" or "off". For example, in different embodiments, it may be desirable to have one, all, or any other number of antennas powered at one time and capable of receiving data.

Antenna management system 12 comprises user equipment 14, base station 16, and plurality of propagation paths 18. Base station 16 transmits plurality of data 21, which may take the form of data packet 34 and another data packet 35, to user equipment 14. During transmission, plurality of data 21 may take plurality of propagation paths 18 to reach user equipment 14. Propagation paths 18 may be one example of one implementation of propagation paths 4-10 in FIG. 1. In one or more embodiments, the transmission technology may utilize high speed download packet access (HSPDA). In different embodiments, other types of transmission technology may be used, such as, for example, GPRS, iBurst, WiBro/WiMAX, UMTS-TDD, UMTS-FDD, HSPA, EVDO, LTE, MMDS, as well as other types of transmission technologies.

User equipment 14 comprises plurality of antennas 20, antenna quality module 22, connection status module 24, control module 26, another system 28, memory element 30, processing unit 32, and battery 33. User equipment 14 may comprise other systems not explicitly indicated in this figure.

Connection status module 24 monitors the status of plurality of antennas 20. In one embodiment, connection status module 24 may monitor for data packet 34 of plurality of data 21. In one or more embodiments, connection status module 24 monitors only for data packets that are designated for user equipment 14. Also, in different embodiments, the content of data packet 34 may be irrelevant. Connection status module 24 may indicate to control module 26 to power "on" more than one of plurality of antennas 20 to measure signal quality in response to at least one of the antennas receiving data packet 34. In one illustrative embodiment, there may be two antennas. In that embodiment, both antennas are powered "on" to measure signal quality on each. When two or more antennas are powered, the situation may be referred to as receive diversity or antenna diversity.

Connection status module 24 also monitors plurality of antennas 20 for activity or inactivity. In one or more advantageous embodiments, connection status module 24 may set connection status 36 to active once data packet 34 is received. Also, in one or more embodiments, when connection status module 24 receives data packet 34, connection status module 24 sets time period 38 for connection status 36. For example, time period 38 may be set by control module 26 dynamically for a suitable time using metrics and statistics of how frequently data packets are received during a transmission from base station 16. In other embodiments, time period 38 may be statically set. For example, time period 38 may be 200 ms, 100 ms, or 50 ms. Once time period 38 elapses, connection status module 24 may indicate to control module 26 to power "off" all antennas except one.

Additionally, connection status module 24 may set connection status 36 to inactive if time period 38 elapses before another packet 35 is received. Another packet 35 may be the packet of data after data packet 34. This period of inactivity may represent that the transmission is over and therefore it may be desirable to have user equipment 14 conserve battery power by using only one antenna. When connection status 36 is inactive, only one antenna may be in operation. However, control module 26 may power both antennas for other reasons.

Antenna quality module 24 may be configured to determine whether signal quality of one of the antennas in plurality of antennas 20 is sufficient to power "on" only the single antenna or if more antennas will be used. Plurality of antennas 20 comprises first antenna 40 and second antennas 42. Each antenna 40-42 may have a measured signal quality, 44 and 46, respectively. Signal quality 44 comprises power level 47 and correlation 48. Signal quality 46 comprises power level 50 and correlation 48. In different embodiments there may be more than two antennas in plurality of antennas 20.

Antenna quality module 24 may be configured to determine whether correlation 48 of antennas 40-42 is greater than threshold 54. Threshold 54 may be a correlation threshold. Correlation 48 may be the cross correlation between two signals coming from antennas 40 and 42. Threshold 54 may be set statically upon manufacturing. Additionally, threshold

54 may be set by a user, dynamically set based on average correlations, or set based on battery power levels. For example, in one embodiment, as the battery begins to lose power, threshold 54 may decrease. Therefore, the likelihood of using two antennas and more battery power is decreased.

Correlation 48 may be the cross-correlation between two antennas, such as first antenna 40 and second antenna 42. Cross-correlation may be a measure of similarity of two waveforms as a function of a time-lag applied to one of them. The measurement may produce a complex result. In one embodiment, threshold 54 may be measured against only the real part of the complex result of cross-correlation. In other embodiments, the imaginary part of the complex result may be used as well.

In one or more advantageous embodiments, the correlation is performed with channel estimates from the radio frequency output after descrambling and dispreading have been applied to the signal. Channel estimation may refer to an estimation of the frequency (and potentially spatial) response of the path between the transmitter and receiver. This knowledge can be used to optimize performance and maximize the transmission rate. Knowledge of a channel may be necessary with a wireless channel that is changing rapidly with time. In one or more embodiments, antenna management system 12 may use a coherent detection system for channel estimation. In this embodiment, pilot information, which is known data at user equipment 14, is transmitted. This pilot signal is used to estimate the channel impulse response. Channel impulse response is a measurable response by a radio communication channel when an electromagnetic impulse is transmitted over the air. The radio propagation channel acts as a time and spacial varying filter which can distort the signal. The filter characteristics are determined both by the reflection of electromagnetic waves off of objects and the movement of reflective surfaces, as well as the movement of the transmitter and/or receiver. The purpose of multiple impulse measurements is to quantify the varying filter characteristics of the communication channel along both the time and spacial dimensions. Because of various propagation paths of a signal, the channel impulse response of a wireless channel may appear as a series of pulses.

In other embodiments, when determining correlation, the radio frequency output may be used without taking the channel estimates. In this embodiment, the radio frequency output may be used after descrambling and dispreading with a primary channel, such as the common pilot channel. In different embodiments, the radio frequency output may be used after demodulating a pilot channel (signal) that is sent by a base station and also known to the user equipment. The radio frequency output when amplified, filtered, and down converted to a lower frequency representation of the radio frequency signal in analog or digital form is the baseband signal.

Also, in different embodiments, the entire signal mixture at each antenna is used from the radio frequency output. This embodiment may use a primary channel, such as the common pilot channel, from a particular base station. The particular base station may have a specific scrambling code which may be known by user equipment 14.

In various embodiments, a combination of more than one of the above techniques for measuring correlation 48 may be used. Also, in different embodiments, the correlation may be taken from more than one of the above techniques and then applied to an analysis to use an average of correlations or one correlation over another correlation such as in a heuristic analysis or function analysis. Additionally, other techniques not listed may also be used to measure correlation 48. Also, the above techniques may be used when determining power levels 47 and 50.

The antenna quality module 22 may make a recommendation to control module 26 based on whether threshold 54 is surpassed. If correlation 48 is less than threshold 54, receive diversity is recommended to control module 26 and both first antenna 40 and second antenna 42 may be powered to receive plurality of data 21.

However, if correlation 48 is greater than threshold 54, then antenna quality module 24 recommends using only one antenna to control module 26. When only one antenna is used, antenna quality module 24 also makes a recommendation on which antenna based on power level.

When one antenna is used, antenna quality module 24 recommends the antenna with the strongest power level. Power level may be referred to as signal strength and may be the power of the electrical field at the antenna. Antenna quality module 24, when recommending only one antenna, may recommend the antenna with the greatest power level. In different embodiments, an antenna is statically selected. For example, first antenna 40 may always be used.

Additionally, control module 26 may receive recommendations from another system 56. Another system 56 may require the use of both antennas for a different purpose. When another system 56 requires the use of both antennas, control module 26 may power both antennas 40-42.

Additionally, user equipment 14 comprises battery 33. In one or more embodiments, battery 33 may be connected to plurality of antennas 20, control module 26 and processing unit 32. In other embodiments, battery 33 is connected to components of FIG. 2 as well. It is also noted that battery 33 may provide power to all components in user equipment 14.

Control module 26 may determine whether battery power level 37 is sufficient to support more than one antenna. Battery power level 37 may be sufficient to support more than one antenna based on a threshold of battery power level 37. For example, the threshold may be set by an operating system of the user equipment, set by the user, or set during manufacturing. In other embodiments, the threshold may be set dynamically. For example, as battery 33 decreases in efficiency, the threshold may increase. Also, the threshold may be set as a percentage of battery power level 37 or as time remaining for battery 33.

Additionally, user equipment 14 may include one or more memory elements (e.g., memory element 30) for storing information to be used in achieving operations associated with applications management, as outlined herein. These devices may further keep information in any suitable memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Any of the memory or storage items discussed herein should be construed as being encompassed within the broad term 'memory element' as used herein in this Specification.

In different illustrative embodiments, the operations for managing antennas outlined herein may be implemented by logic encoded in one or more tangible media, which may be inclusive of non-transitory media (e.g., embedded logic provided in an ASIC, digital signal processor (DSP) instructions, software potentially inclusive of object code and source code to be executed by a processor or other similar machine, etc.). In some of these instances, one or more memory elements (e.g., memory element 30) can store data used for the operations described herein. This includes the memory elements being able to store software, logic, code, or processor instructions that are executed to carry out the activities described herein.

Additionally, user equipment 14 may include processing unit 32. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, an EPROM, an EEPROM), or an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

The illustration of antenna management system 12 in FIG. 2 is not meant to imply physical or architectural limitations to the manner in which different illustrative embodiments may be implemented. Other components in addition and/or in place of the ones illustrated may be used. Some components may be unnecessary in some illustrative embodiments. Also, the blocks are presented to illustrate some functional components. One or more of these blocks may be combined and/or divided into different blocks when implemented in different advantageous embodiments.

For example, in one or more embodiments, processing unit 32 may comprise antenna quality module 22, connection status module 24, and control module 26. However, in other embodiments, quality module 22, connection status module 24, and control module 26 may be separate physical circuitry from processing unit 32.

Figure 3:
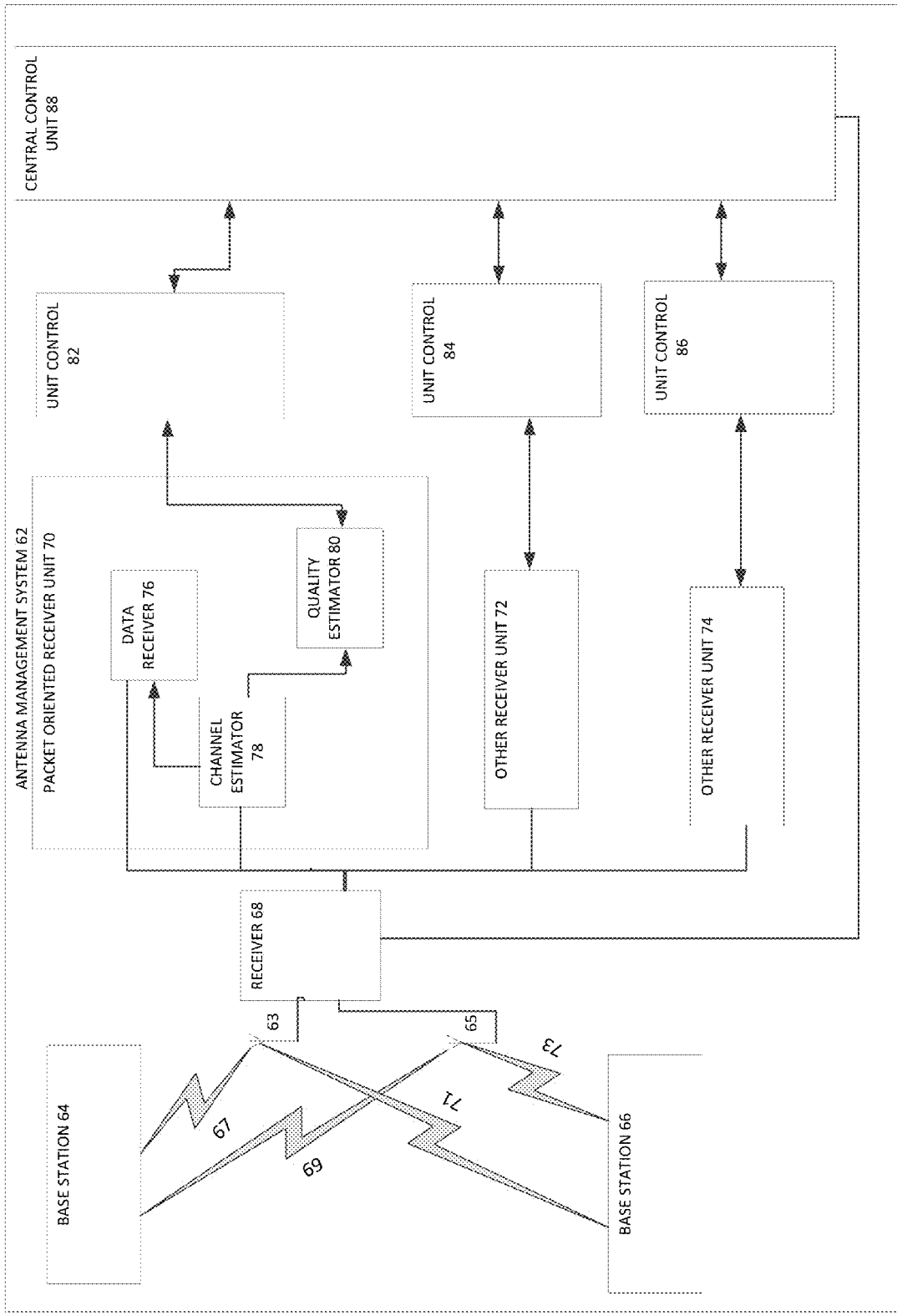
FIG. 3 is a block diagram of an antenna management system in accordance with an illustrative embodiment.

FIG. 3 is a block diagram of an antenna management system in accordance with an illustrative embodiment. Antenna management system 62 manages the operation of antennas 63 and 65 associated with receiver 68. In different embodiments, it may be desirable to have different antennas or numbers of antennas powered "on" or "off". For example, in different embodiments, it may be desirable to have one, all, or any other number of antennas powered at one time and cable of receiving data.

In antenna management system 62, base stations 64 and 66 transmit signals. The signal transmitted by each base station may take different propagation paths. A set of one or more propagation paths may in their entirety describe a radio channel. For example, antenna 63 may receive a signal via radio channel 67 from base station 64 and a signal via radio channel 71 from base station 66. These signals, while containing the same information as the signals received by antenna 65, by way of radio channels 69 and 73, have travelled through different paths and comprise different properties, as described with respect to FIG. 1, than the signals received by antenna 65, via radio channels 67 and 71. Radio channels 67-73 may be estimated for each antenna at the user equipment. The estimation may include the channel impulse response containing delays and powers of the propagation paths as well as other information. For HSDPA, only base station may be used in the estimation. In other transmission technologies, there may be packet oriented links to more than one base station. For example, two base stations and two user equipment antennas may result in four radio channels.

Receiver 68 manages the reception of signals. Receiver 68 transfers the data from the signals to various receiver units 70, 72, and 74. Packet oriented receiver unit 70 may be a high speed downlink packet access receiver unit. In other embodiments, other types of packet technology are used. Packet oriented receiver unit 70 may include an antenna quality module and a connection status module similar to those in FIG. 2. Packet oriented receiver unit 70 comprises data receiver 76, channel estimator 78, and quality estimator 80.

Data receiver 76 processes the data for substantive use of the data. Channel estimator 78 identifies the channel state information of each antenna. Quality estimator 80 identifies the correlations for each antenna and power levels. Correlation may be identified with the high speed downlink packet access serving cell using the channel estimates of each antenna. Quality estimator 80 sends the correlations and power levels to unit control 82.

Unit control 82 makes a recommendation to central control unit 88 to use either both antennas, antenna 63, or antenna 65 based on the correlations and power levels as described herein. Unit controls 84 and 86 may make recommendations based on other processes.

Central control unit 88 may be one example of one implantation of control module 26 in FIG. 2. Central control unit 88 may power either both antennas or just one antenna based on recommendations from all of the unit controls 82-86.

The illustration of antenna management system 62 in FIG. 3 is not meant to imply physical or architectural limitations to the manner in which different illustrative embodiments may be implemented. Other components in addition and/or in place of the ones illustrated may be used. Some components may be unnecessary in some illustrative embodiments. Also, the blocks are presented to illustrate some functional components. One or more of these blocks may be combined and/or divided into different blocks when implemented in different advantageous embodiments.

The various embodiments provide for conserving battery energy by powering only one antenna during inactivity. The antennas may be only switched on during a period of activity. Additionally, various embodiments provide that the second antenna may be turned on when there is not a sufficient level of correlation between the antennas.

Also, various embodiments provide for an antenna with greater signal strength to be selected as the operating antenna during packet reception. The antenna may be selected for signal strength or may be statically selected.

The different embodiments provide a dynamic selection of antennas by using signal strength, correlation, and antenna activity during reception. The various embodiments provide for using different combination of these techniques to improve user equipment efficiency and/or battery power efficiency.

Figure 4:
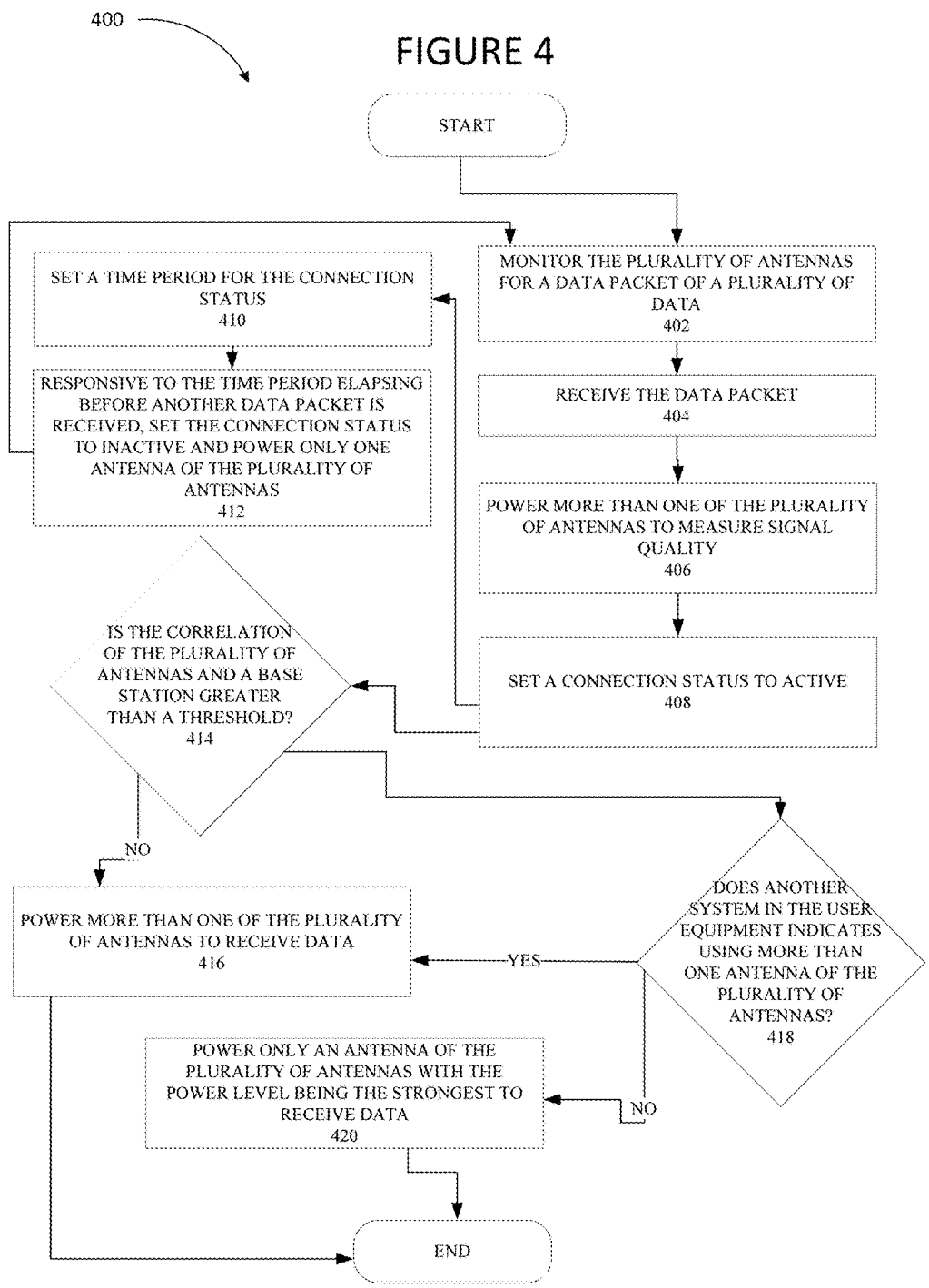
FIG. 4 is a flowchart for managing a plurality of antennas on user equipment in accordance with an illustrative embodiment.

FIG. 4 is a flowchart for managing a plurality of antennas on user equipment in accordance with an illustrative embodiment. Process 400 may be implemented in antenna management system 12 from FIG. 2.

Process 400 begins with a connection status module monitoring the plurality of antennas for a data packet of a plurality of data (step 402). Next, the data packet is received at the plurality of antennas (step 404). Then, a control module powers more than one of the plurality of antennas to measure signal quality (step 406). Also, the connection status module sets a connection status to active (step 408).

When the connection status is active, the connection status module sets a time period for the connection status (step 410). The connection status module sets the connection status to inactive and the control module powers only one antenna of the plurality of antennas in response to the time period elapsing before another data packet is received (step 412). Once the connection status is inactive, the process moves back to step 402.

Also once the connection status is set to active, an antenna quality module determines whether a correlation of each of the plurality of antennas and a base station is greater than a threshold (step 414). If the correlation in all of the antennas with the base station is less than the threshold, the control module powers more than one of the plurality of antennas to receive data (step 416). In one or more embodiments, when there are two antennas, all of the antennas are powered. Thereafter the process terminates. However, while the process terminates, the process may be repeated any number of times.

If the correlation in one of the antennas with the base station is greater than the threshold, the process moves to step 418. Then, the control module determines if another system in the user equipment indicates a desire to use more than one antenna (step 418). If there is another system indicating a desire to use more than one antenna, the process moves to step 416 and the control module powers more than one of the plurality of antennas to receive data.

If there is not another system indicating a desire to use more than one antenna, the control module powers only one antenna of the plurality of antennas with the power level being the strongest to receive data (step 420). Thereafter, the process terminates. The antenna quality module identifies the power level of each antenna that exceeded the threshold. The antenna with the highest power level (signal level) may be the strongest to receive the data. In different embodiments, when only one antenna is used, it may always be the same antenna. For example, in one or more embodiments, only the first antenna may be used. In other embodiments, only the second antenna may be used when using one antenna.

Also, in one or more embodiments, the threshold may be set to fully correlated. In this situation, the antennas will never exceed the threshold and will always use receive diversity when a packet is detected. When the threshold is set to fully correlated, steps 416-420 may be removed.

Figure 5:
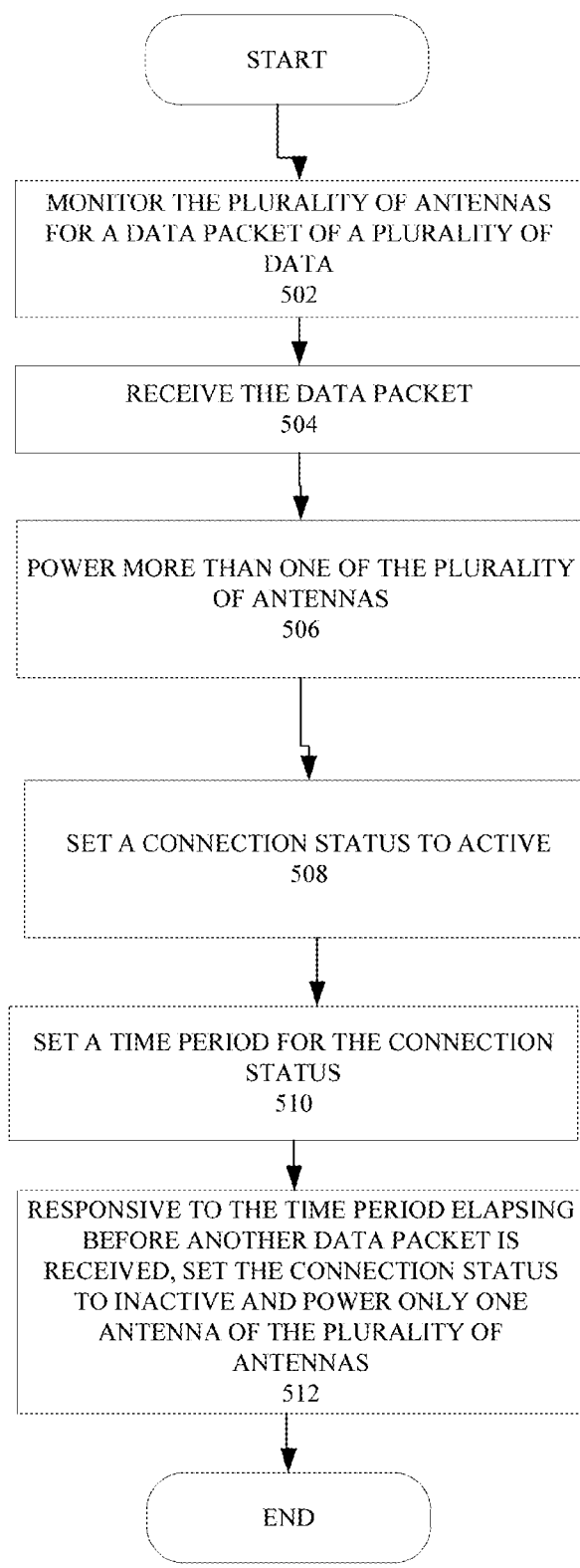
FIG. 5 is a flowchart for managing a plurality of antennas on user equipment with a fully correlated threshold in accordance with an illustrative embodiment.

FIG. 5 is a flowchart for managing a plurality of antennas on user equipment with a fully correlated threshold in accordance with an illustrative embodiment. Process 500 may be implemented in antenna management system 12 from FIG. 2.

Process 500 begins with a connection status module monitoring the plurality of antennas for a data packet of a plurality of data (step 502). Next, the data packet is received at the plurality of antennas (step 504). Then, a control module powers more than one of the plurality of antennas for receive diversity (step 506). Also, the connection status module sets a connection status to active (step 508).

When the connection status is active, the connection status module sets a time period for the connection status (step 510). Then, the connection status module sets the connection status to inactive and the control module powers only one antenna of the plurality of antennas in response to the time period elapsing before another data packet is received (step 512). Once the connection status is inactive, the process terminates.

FIG. 6 is a flowchart for managing a plurality of antennas on user equipment in accordance with an illustrative embodiment. Process 600 may be implemented in antenna management system 12 from FIG. 2.

Process 600 begins with a connection status module monitoring the plurality of antennas for a data packet of a plurality of data (step 602). Next, the data packet is received at the plurality of antennas (step 604). Then, a control module powers more than one of the plurality of antennas to measure signal quality (step 606). Also, the connection status module sets a connection status to active (step 608).

When the connection status is active, the connection status module sets a time period for the connection status (step 610). The connection status module sets the connection status to inactive and the control module powers only one antenna of the plurality of antennas in response to the time period elapsing before another data packet is received (step 612). Once the connection status is inactive, the process moves back to step 602.

Also once the connection status is set to active, an antenna quality module determines whether a correlation of each of the plurality of antennas and a base station is greater than a threshold (step 614). If the correlation in all of the antennas with the base station is less than the threshold, the control module determines if the battery power level is sufficient to support more than one antenna (step 615). The battery power level may be sufficient to support more than one antenna based on a threshold of battery power level. For example, the threshold may be set by an operating system of the user equipment, set by the user, or set during manufacturing. In other embodiments, the threshold may be set dynamically. For example, as the battery decreases in efficiency, the threshold may increase. Also, the threshold may be set as a percentage of battery power level or as time remaining for the battery. Thereafter the process terminates. However, while the process terminates, the process may be repeated any number of times.

If the battery power level is sufficient, the control module powers more than one of the plurality of antennas to receive data (step 616). If the battery power level is insufficient, the process moves to step 620.

If the correlation in one of the antennas with the base station is greater than the threshold, the process moves to step 618. Then, the control module determines if another system in the user equipment indicates a desire to use more than one antenna (step 618). If there is another system indicating a desire to use more than one antenna, the process moves to step 615.

If there is not another system indicating a desire to use more than one antenna, the control module powers only one antenna of the plurality of antennas with the power level being the strongest to receive data (step 620). Thereafter, the process terminates.

The flowcharts and block diagrams in the different depicted embodiments illustrate the architecture, functionality, and operation of some possible implementations of apparatus, methods, system, and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

What is claimed is:

1. A method for managing a plurality of antennas on user equipment, the method comprising:

monitoring the plurality of antennas to identify a data packet of a plurality of data from signals received from one or more base stations; and responsive to identifying the data packet, powering more than one of the plurality of antennas to measure signal quality, wherein the signal quality comprises a power level of each of the plurality of antennas and a correlation of the plurality of antennas,
responsive to identifying the data packet, setting a connection status to active;
responsive to the connection status being active, determining whether the correlation of the plurality of antennas is greater than a threshold
responsive to the correlation being greater than the threshold, providing power to a single antenna of the plurality of antennas with the strongest power level to receive data,
wherein each of the plurality of antennas is capable of being powered on or powered off to receive signals from the one or more base stations.

2. The method of claim 1 further comprising:
monitoring the connection status;
responsive to the connection status being active, setting a time period for the connection status; and
responsive to the time period elapsing before identifying another data packet, setting the connection status to inactive and powering only one antenna of the plurality of antennas.

3. The method of claim 1 further comprising:
responsive to the correlation being less than the threshold, powering more than one of the plurality of antennas to receive data.

4. The method of claim 1 further comprising:
determining whether another system in the user equipment indicates using more than one antenna of the plurality of antennas; and
responsive to the another system in the user equipment indicates using more than one antenna of the plurality of antennas, powering more than one antenna of the plurality of antennas.

5. A system for managing a plurality of antennas on user equipment, the system comprising:
the plurality of antennas each capable of being powered on or off to receive signals from one or more base stations;
a connection status module configured to monitor the plurality of antennas to identify a data packet of a plurality of data from the signals received from the one or more base stations;
a control module configured to power more than one of the plurality of antennas to measure signal quality in response to receiving the data packet, wherein the signal quality comprises a power level of each of the plurality of antennas and a correlation of the plurality of antennas;
wherein the connection status module is further configured to set a connection status to active in response to receiving the data packet
an antenna quality module configured to determine whether the correlation of the plurality of antennas is greater than a threshold in response to the connection status being active,
wherein the control module is further configured to power a single antenna of the plurality of antennas with the strongest power level to receive data in response to the correlation being greater than the threshold.

6. The system of claim 5 wherein the connection status module is further configured to:
monitor the connection status;
set a time period for the connection status in response to the connection status being active; and
set the connection status to inactive and powering only one antenna of the plurality of antennas in response to the time period elapsing before identifying another data packet received from the one or more base stations.

7. The system of claim 5 wherein the control module is further configured to:
power more than one of the plurality of antennas to receive data in response to the correlation being less than the threshold.

8. The system of claim 5 wherein the control module is further configured to:
determine whether another system in the user equipment indicates using more than one antenna of the plurality of antennas; and
power more than one antenna of the plurality of antennas in response to the another system in the user equipment indicates using more than one antenna of the plurality of antennas.

9. A computer program product comprising logic encoded on a tangible media, the logic comprising instructions for:
monitoring the plurality of antennas in a single user equipment device to identify a data packet designated for the user equipment device out of a plurality of data received from one or more base stations;
responsive to receiving the data packet, powering more than one of the plurality of antennas to measure signal quality and setting a connection status to active, wherein the signal quality comprises a power level of each of the plurality of antennas and a correlation of the plurality of antennas;
responsive to the connection status being active, determining whether the correlation of the plurality of antennas is greater than a threshold; and
responsive to the correlation being greater than the threshold, providing power to a single antenna of the plurality of antennas with the strongest power level to receive data.

10. The computer program product of claim 9 further comprising instructions for:
monitoring the connection status;
responsive to the connection status being active, setting a time period for the connection status; and
responsive to the time period elapsing before another data packet is received and identified, setting the connection status to inactive and providing power to a single antenna of the plurality of antennas.

11. The computer program product of claim 10 further comprising instructions for:
responsive to the correlation being less than the threshold, powering more than one of the plurality of antennas to receive data.

* * * * *